US009352696B2

(12) United States Patent
Gorey et al.

(10) Patent No.: US 9,352,696 B2
(45) Date of Patent: May 31, 2016

(54) LOW PROFILE ROOF RAIL

(71) Applicant: HONDA MOTOR CO., LTD., Tokyo (JP)

(72) Inventors: Colin P. Gorey, Marysville, OH (US); David John Pietenpol, Upper Arlington, OH (US); Lin Z. Lee, Powell, OH (US); Christopher Salvador, Delaware, OH (US); Hirofumi Takemoto, Dublin, OH (US); John H. Manning, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 324 days.

(21) Appl. No.: 14/076,703

(22) Filed: Nov. 11, 2013

(65) Prior Publication Data

US 2015/0129625 A1   May 14, 2015

(51) Int. Cl.
*B60R 9/04*      (2006.01)
*B60R 9/052*    (2006.01)

(52) U.S. Cl.
CPC .. *B60R 9/04* (2013.01); *B60R 9/052* (2013.01)

(58) Field of Classification Search
CPC .... B60R 9/052; B60R 9/04; B60R 2011/004; B60R 9/08; B60R 9/12; B60R 9/048; B60R 9/05; B60R 9/058; B60R 9/045
USPC .......................... 224/309, 316, 319, 324–327
See application file for complete search history.

(56) References Cited

U.S. PATENT DOCUMENTS

| 4,279,368 | A | | 7/1981 | Kowalski | |
|---|---|---|---|---|---|
| 4,448,336 | A | * | 5/1984 | Bott | B60R 9/04 224/309 |
| 4,640,450 | A | * | 2/1987 | Gallion | B60R 9/058 224/315 |
| 5,016,799 | A | | 5/1991 | Stapleton | |
| 5,069,377 | A | * | 12/1991 | Baughman | B60R 9/00 224/321 |
| 5,306,156 | A | * | 4/1994 | Gibbs | B60Q 1/302 224/315 |
| 5,497,925 | A | | 3/1996 | Lumpe et al. | |
| 5,518,157 | A | | 5/1996 | Evels et al. | |
| 5,573,159 | A | | 11/1996 | Fisch et al. | |
| 5,617,981 | A | | 4/1997 | Ricker et al. | |
| 5,765,737 | A | | 6/1998 | Cucheran et al. | |

(Continued)

FOREIGN PATENT DOCUMENTS

JP          2000095152 A  *  4/2000

*Primary Examiner* — Justin Larson
*Assistant Examiner* — Scott McNurlen
(74) *Attorney, Agent, or Firm* — Kenealy Vaidya LLP

(57) ABSTRACT

A roof rail for mounting to a vehicle. The rail has an elongated base of plastic and a metal stay member. The stay member has a first surface oriented for mating with a vehicle roof and a second surface oriented for receiving a cross bar. The stay member is encapsulated by the plastic forming the elongated base. The first surface includes at least two openings configured for receiving a fastener. The second surface includes at least two passages configured for receiving a fastener. An elongated plastic cap element is also provided. The cap element has a first edge engaging the elongated base adjacent the first surface of the stay member and a second edge engaging the base adjacent the second surface of the stay member, but does not cover the second surface of the stay member.

18 Claims, 5 Drawing Sheets

(56) References Cited

U.S. PATENT DOCUMENTS

| | | | |
|---|---|---|---|
| 6,338,428 B1 | 1/2002 | Kawasaki et al. | |
| 7,204,396 B1 * | 4/2007 | Stapleton | B60R 9/04 224/309 |
| 7,370,780 B2 | 5/2008 | Thiele et al. | |
| 8,328,057 B2 * | 12/2012 | Johnson | B60R 9/045 224/321 |
| 2006/0103157 A1 * | 5/2006 | Raffler | B62D 25/06 296/29 |
| 2009/0145941 A1 * | 6/2009 | Kiyota | B60R 9/04 224/326 |
| 2010/0288807 A1 | 11/2010 | Neu et al. | |
| 2010/0327033 A1 | 12/2010 | Payne | |
| 2012/0228348 A1 * | 9/2012 | Aftanas | B60R 9/058 224/309 |
| 2012/0248164 A1 | 10/2012 | Aftanas et al. | |
| 2012/0273535 A1 * | 11/2012 | Aftanas | B60R 9/04 224/309 |
| 2012/0325874 A1 | 12/2012 | Silamianos et al. | |

* cited by examiner

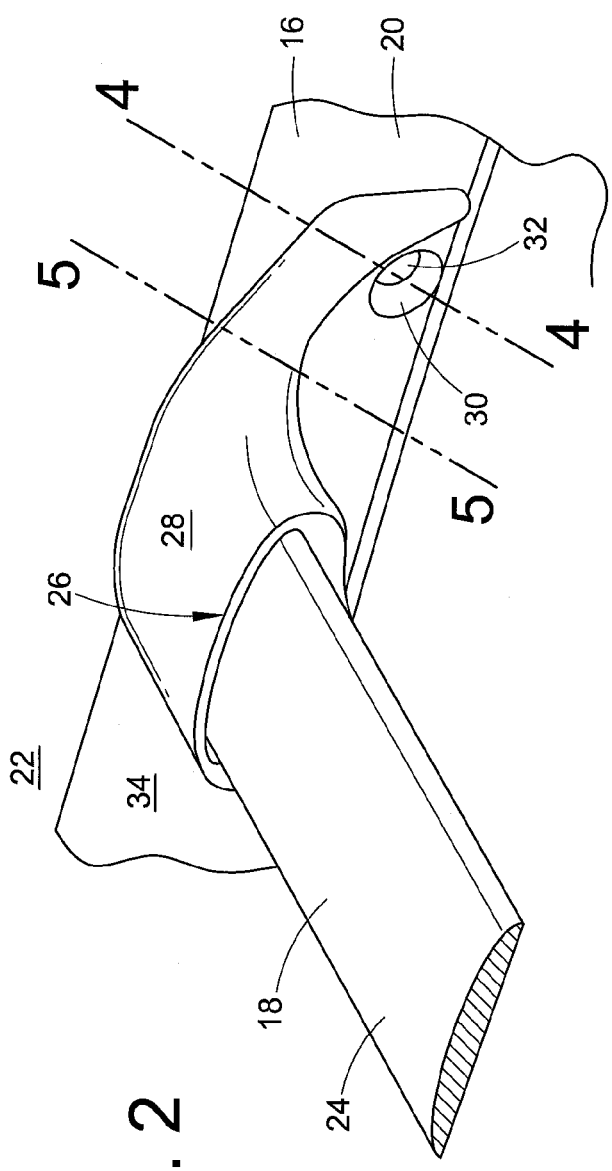
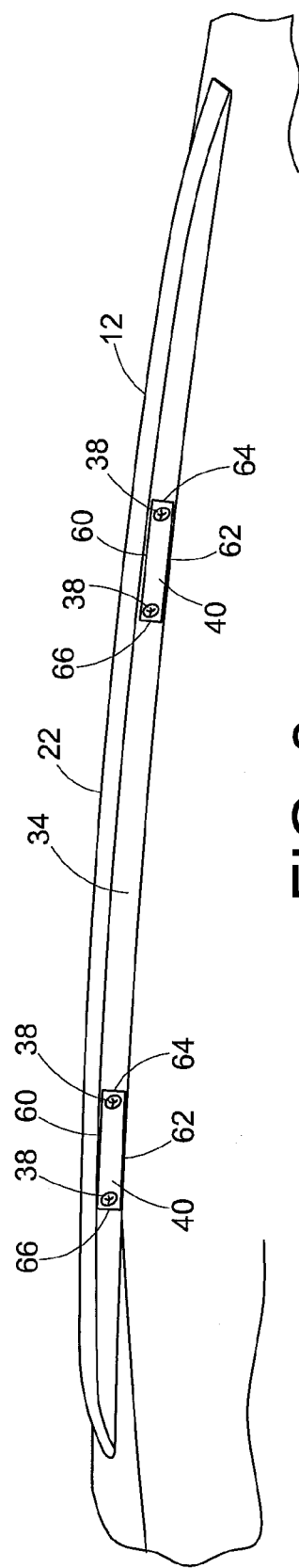
FIG. 2
FIG. 3

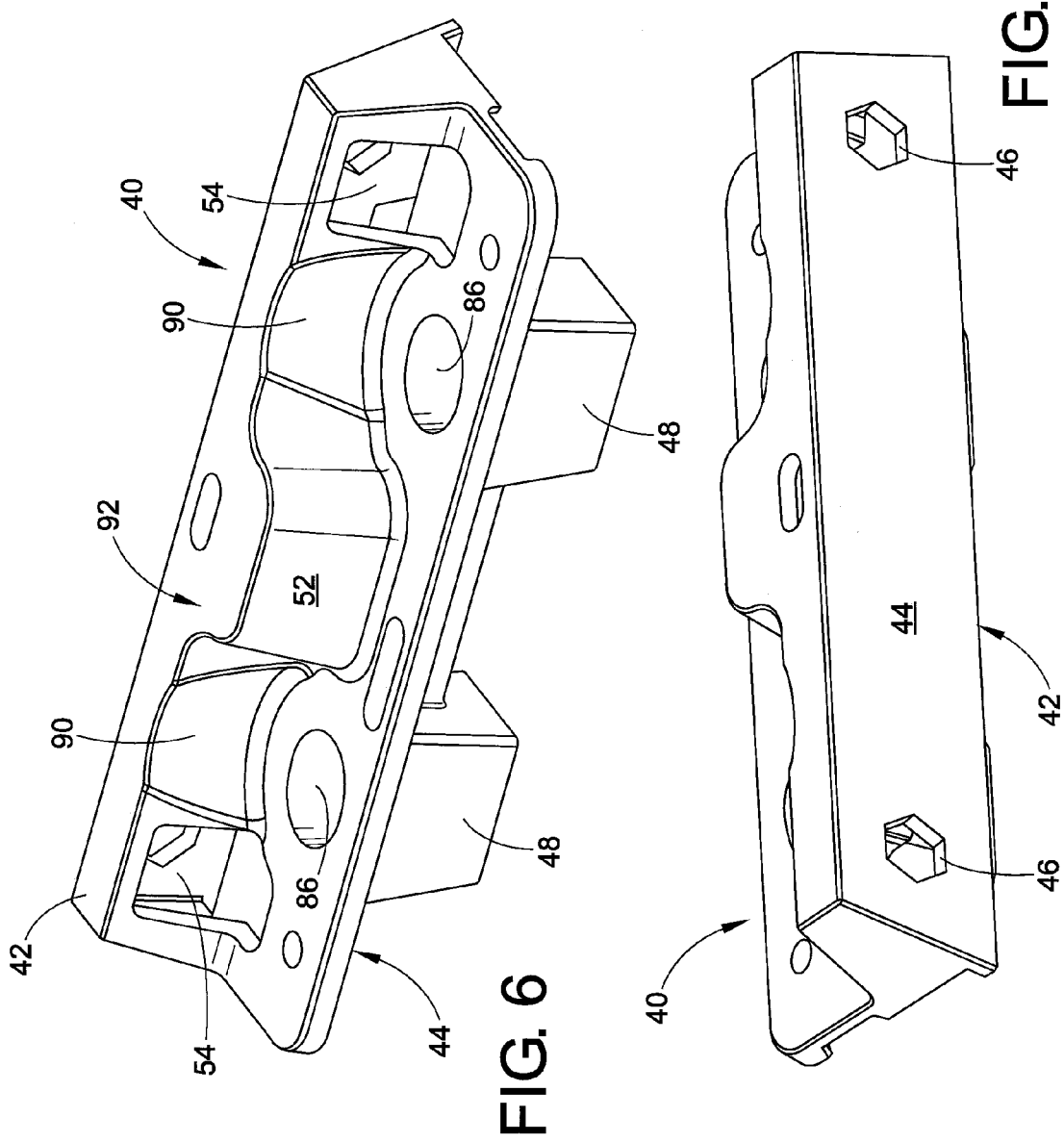

LOW PROFILE ROOF RAIL

BACKGROUND

The present exemplary embodiment relates to a roof rail including an overmolded metal stay. It finds particular application in conjunction with a low profile roof article carrier assembly for an automotive vehicle. However, it is to be appreciated that the present exemplary embodiment is also amenable to other types of vehicles and applications.

Vehicle article carrier systems are used in a wide variety of applications to support articles of various sizes and shapes above an outer body surface of an automotive vehicle. Vehicle article carrier systems can be found in use on a wide variety of different types of motor vehicles such as cars, SUVs, trucks, mini-vans, full size vans, etc. Typically a vehicle article carrier makes use of a pair of support rails that are secured to the outer body surface of the vehicle, such as the roof of the vehicle. The support rails are usually oriented parallel to one another and extend along a major longitudinal length of the vehicle. One or more cross bars may be supported at their outer end by the support rails such that the cross bars extend perpendicular to the support rails and above the roof surface. Articles can then be supported on the cross bars so that they are positioned above the roof of the vehicle.

Often, each roof rail is secured between a pair of stanchions that elevate the rail above the roof. Typically, each stanchion includes a base or stay that is secured to the roof by bolts, screws or other fasteners. In order to protect the fasteners and provide the stanchion with a pleasing exterior appearance, a cover is usually attached thereto by screws, bosses, tabs, snap-fits or other types of fasteners. One shortcoming of the stanchion style of roof rack article carrier is its relatively high profile which can reduce aerodynamic efficiency of the vehicle.

Frequently, the structural elements of the roof rack such as the stanchions and rails are formed from a metal, such as aluminum. However, it may be desirable to form elements of the roof rack from plastic to reduce weight, provide a cost effective manufacturing operation, and allow variation in cross sectional shape or cross sectional area that provides an aesthetic appearance and aerodynamic shape. Nonetheless, it is advantageous to provide the roof rack article with sufficient strength achieved typically via metal components. The present disclosure advantageously sets forth a low profile roof rack design that combines the strength of metallic components with the light weight, and low cost manufacturability of plastic components.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a roof rail for mounting to a vehicle is provided. The rail has an elongated base comprised of plastic and at least two stay members comprised of metal. The stay members have a first surface oriented for mating with a vehicle roof and a second surface oriented for receiving a cross bar. The stay members are encapsulated by the plastic forming the elongated base. The first surface includes at least two openings configured for receiving a fastener. The second surface includes at least two passages configured for receiving a fastener. An elongated plastic cap element is also provided. The cap element has a first edge engaging the elongated base adjacent the first surface of each of the stay members and a second edge engaging the elongated base adjacent the second surface of each of the stay members. The cap element does not cover the second surface of the stay members.

According to a second embodiment, a vehicle article carrier rail for attachment to a roof of a vehicle is provided. The rail has an elongated plastic base portion and a metallic stay member encapsulated within the plastic base portion. The stay member has a roof engaging wall and a cross bar receiving wall. The cross bar receiving wall includes top and bottom edges and first and second side edges. The encapsulation plastic of the base portion terminates adjacent at least three of the edges of the cross bar receiving wall providing an unencapsulated stay member region.

According to a further embodiment, a vehicle article carrier adapted for attachment to a roof of a vehicle is provided. The carrier has a pair of rail elements having an elongated plastic base portion. A stay member is encapsulated within the plastic base portion. The stay member includes a roof engaging surface and a cross-bar receiving surface. A cover provides an uninterrupted and continuous surface between the cross-bar receiving surface and the roof engaging surface and throughout the length of each rail element.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated samples, however, are not exhaustive of the many possible embodiments of the disclosure. Other advantages and novel features of the disclosure will be set forth in the following detailed description of the disclosure when considered in conjunction with the drawings, in which:

The drawings described herein are for illustration purposes only and are not intended to limit the scope of the present disclosure in any way.

FIG. 2 is an exploded perspective view of a cross bar attached to the rail of FIG. 1;

FIG. 3 is a perspective view of one support rail with the cross bars detached;

FIG. 6 is a perspective view of the stay member in accord with one embodiment of the present disclosure; and FIG. 7 is a reverse perspective view of the stay member of FIG. 6.

DETAILED DESCRIPTION

Embodiments of the invention will be described hereinafter with reference to the accompanying drawings. In this detailed description reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
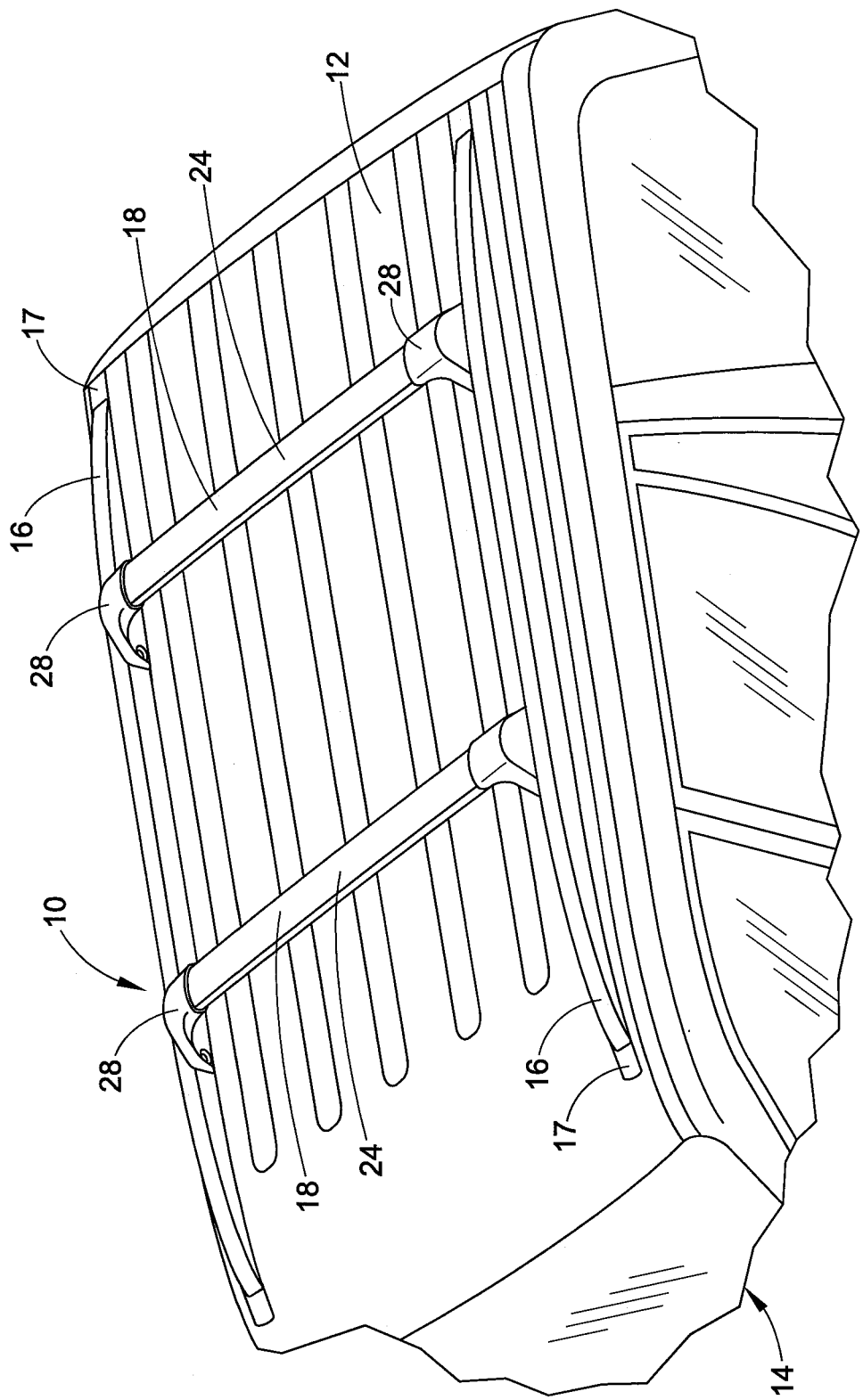
FIG. 1 is a perspective view of a motor vehicle having an article carrier system in accord with one embodiment of the present disclosure.

Referring to FIG. 1, there is shown a vehicle article carrier system 10 installed on a roof 12 of a motor vehicle 14, which in this example is an SUV. However, it will be appreciated that the system 10 may be installed on virtually any type of vehicle.

The article carrier system 10 includes a pair of support rails 16 that are fixedly secured to the roof 12. The support rails 16 can be formed as a mirror image pair and as such can be otherwise identical in construction. The support rails 16 are secured generally parallel to one another and extend along a major longitudinal axis of the vehicle 14. Each support rail 16 can be disposed within a trough 17 formed in the roof 14. The roof troughs 17 can extend at least generally parallel to one another near the longitudinal sides of the roof 14. The roof troughs 17 form channels within which each of the support rails 16 can be disposed. In this manner the support rail is able to "nest" within its associated roof trough and present an upper surface that does not protrude substantially above the roof when installed.

A pair of cross bars 18, which in this example are identical in construction, are secured to the support rails 16. Of course, in certain embodiments it may be desirable to provide cross bars of different configurations. The cross bars 18 support articles above the roof 14 with the aid of external fastening implements, not shown, which may include bungee straps, nylon ratcheting or cam buckle strap assemblies, etc. Although only two cross bars are depicted, the article carrier system 10 can include three or more cross bars.

Referring to FIG. 2, the attachment of one of the cross bars 18 to one of the support rails 16 is shown in greater detail. The support rail 16 includes elongated base 20 and plastic cap 22. The plastic cap 22 can provide a continuous uninterrupted surface throughout the width and length of the support rail 16. More particularly, the plastic cap does not necessarily include openings typically present to provide access to an interior of the support rail to facilitate the step of attachment of the rail to the vehicle roof.

The cross bar 18 includes an elongated beam 24 received within a receptacle 26 formed in a bracket 28. Beam 24 and bracket 28 can be formed of a metal, such as aluminum. Bracket 28 includes two passages 30 (only one is visible), through which a fastener 32, such as a bolt or screw, can penetrate a sidewall 34 of the elongated base 20. Although not visible in FIG. 2 because it is overlapped by bracket 28, the region of sidewall 34 to which the crossbar 18 is attached is an exposed surface of a metallic stay overmolded within the plastic material forming elongated base 20.

With reference to FIG. 3, the support rail 16 having the cross bars removed is displayed. Particularly, with the cross bars removed, an exposed surface of metallic stays 40 which are molded within the elongated base 20 is visible on the sidewall 34 of the support rail 16. The metallic stays 40 can be formed of any suitable material. For example, they can be die cast aluminum.

Holes which can receive and mate with the fasteners 32 of cross bars 18 are provided in the metallic stays 40, but are filled with plugs 38 in the depicted embodiment. Plugs 38 protect the internal environment of the support rail 16 when the cross bars 18 are detached from the article carrier system 10. The holes can have threads machined therein or may retain nuts or any other type of fastening device suitable for receiving a bolt, screw or clip, as examples, from the cross bar 18. In short, any type of fastening device that allows selectively securing the cross bar 18 to the support rail 16 is suitable.

Figure 4:
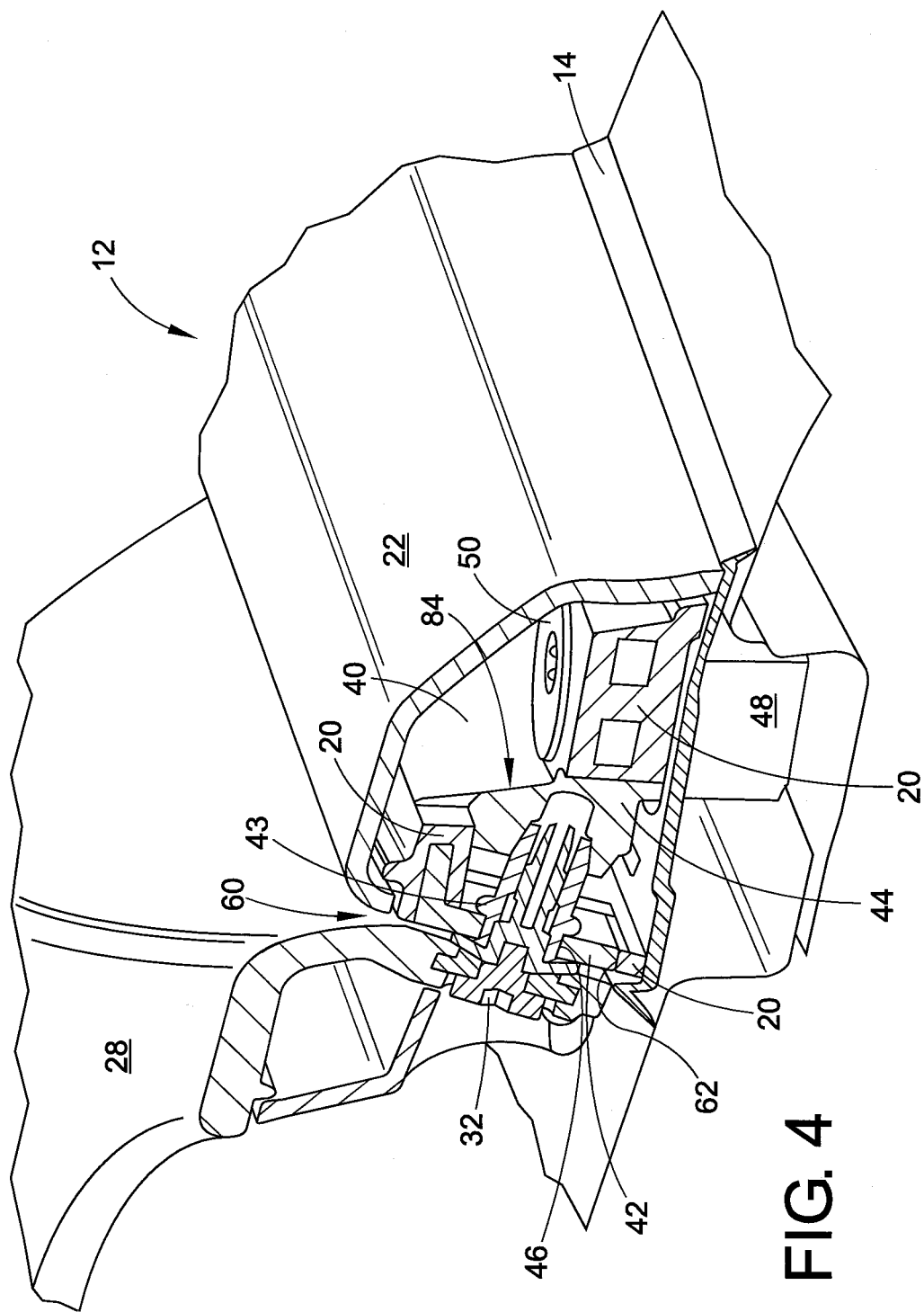
FIG. 4 is an enlarged cross-sectional perspective view taken along line 4-4 of FIG. 2.
Figure 5:
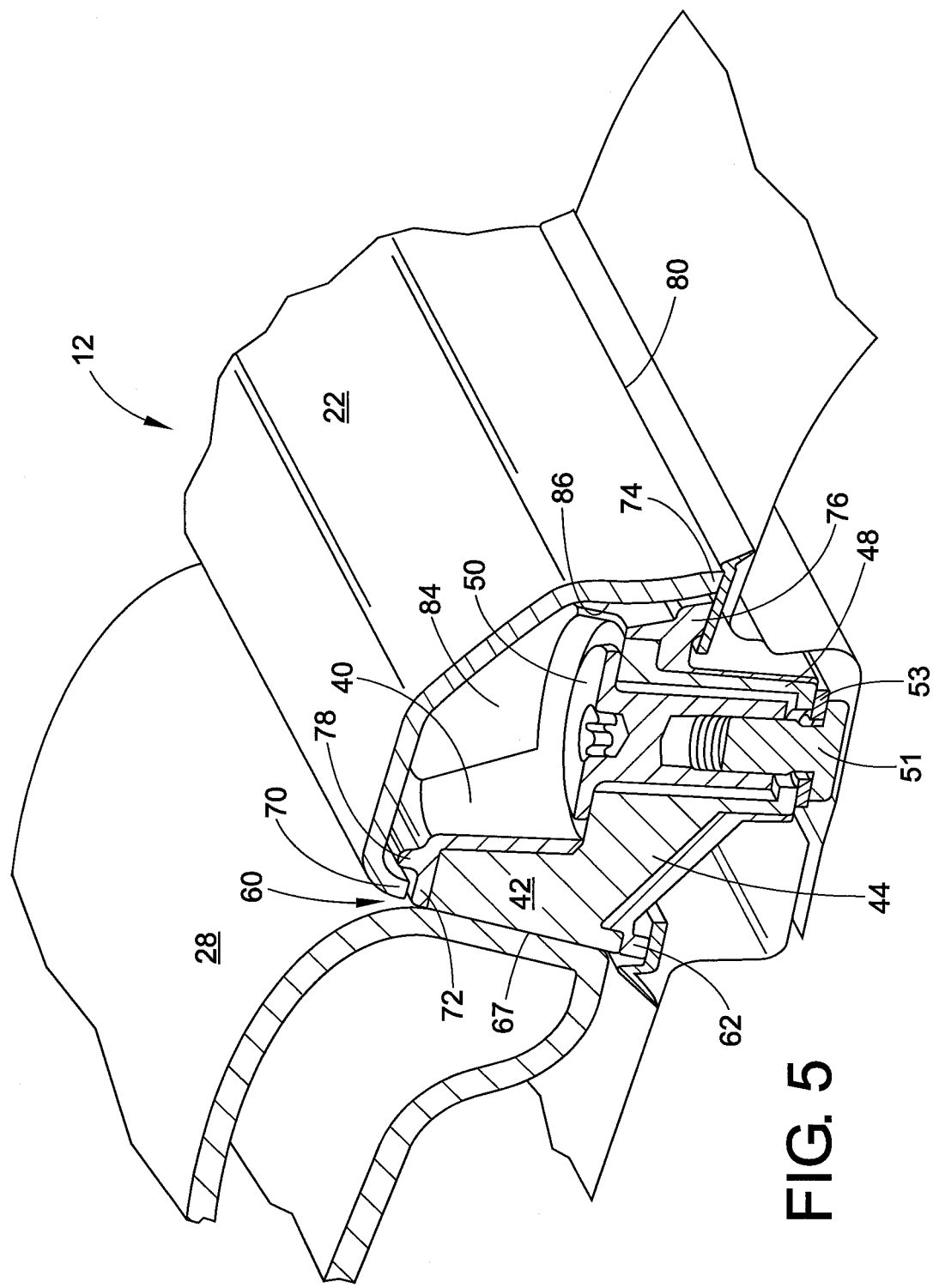
FIG. 5 is an enlarged, cross-sectional perspective view taken along line 5-5 of FIG. 2.

With reference to FIGS. 4 and 5, the support rail 16 includes a plastic base 20 in which one or more metallic stays 40 has been overmolded. Thus, the support rail 16 forms a light weight and cost efficient component because only a relative small portion of the support rail elongated base 20 is made from a metallic material. While only two stays 40 are shown, it will be appreciated that a greater or lesser number of stays could be incorporated into the elongated base 20 of support rail 16.

A manufacturing advantage is provided by the presently disclosed vehicle article carrier system because the elongated base 20 can be formed using conventional molding technology. For example, injection molding can be employed. Injection molding of the present type can also be referred to as insert molding because the metal insert stay is molded within the plastic piece being formed. Injection molding can be performed with a host of materials, but most common are thermoplastic and thermosetting polymers. Material for the part is fed into a heated barrel, mixed and forced into a mold cavity where it cools and hardens around the insert part to the configuration of the cavity. Once the required temperature has been achieved, the mold is opened, an array of pins, sleeves, strippers, etc. are driven forward to demold the article, the article is removed, the mold is closed, and the process is repeated.

In the overmolding process, it may be desirable to encase the entire exterior surface of the stay 40 with the exception of cross bar receiving surface 41 of cross bar mating wall 42. Moreover, since the stay 40 provides an attachment point for the cross bar 18, particularly the bracket 28, it can be advantageous if the interface between cross bar bracket 28 and the metallic stay 40 is metal on metal.

With respect to cross bar mating wall 42, it may be desirable that the encapsulating plastic material terminate at each edge 60, 62, 64, 66 (refer to FIG. 3 edges for 64/66), such that a flush surface is formed between cross bar receiving surface 41 and the adjacent plastic material of elongated base 20. As used herein, the term flush is intended to indicate that the plastic material terminates adjacent the edge of the cross bar receiving surface such that the adjacent plastic material is at least substantially coplanar with the plane in which the cross bar receiving surface resides.

Furthermore, it may be desirable that the perimeter of the mating surface 67 of the bracket 28 conforms with the exposed metal cross bar receiving surface 41 of the stay 40, both in shape and dimension. In this manner, the mating surface 67 of bracket 28 directly contacts the exposed metal cross bar receiving surface 41 of cross bar mating wall 42 without any intervening plastic, yet it is closely surrounded by plastic in an installed condition.

It may also be desirable to provide cross bar receiving surface 41 with a coating of a color matching the color of the plastic forming base 20. Therefore, when the cross bar is removed, the appearance of the support rail remains aesthetic in view of the color match between the cross bar receiving surface 41 of stay 40 and the adjacent plastic of the elongated base 20 and optionally the plastic cap 22.

FIG. 4 displays the mechanism for attachment of the cross bar 18 to the support rail 16. Support rail 16 includes elongated base 20 within which metallic stay 40 has been insert molded. Stay 40 can have a configuration of the type shown in FIGS. 6 and 7.

Stay 40 can include a first cross bar mating wall 42 and a second roof engaging portion 44. Cross bar mating wall 42 can include passages 46 through which fasteners 32 are received. Fasteners 32 can have a bolt portion retained within bracket 28 and a nut portion 43 retained within passages 46 in cross bar mating wall 42. Alternatively, passages 46 may be formed as a boss defining a threaded hole. The holes can be configured (i.e., in size and spacing) to accept predetermined threaded fasteners associated with the brackets 28.

Roof engaging portion 44 can include a pair of bosses 48 encompassing a retaining nut 50 configured to receive a bolt 51 suitable for attachment of the support rail 16 to the vehicle 14. An intervening washer 53 may also be provided. Washer 53 may also be employed to retain bolt 51 in an upward mounting post orientation to receive retaining nut 50 during the process of attaching the support rail 16 to the vehicle 14.

It may be advantageous that the point of attachment of the metallic stay to the roof 12 be aligned as close as possible with the A-pillar and the C-pillar of the vehicle. Moreover, attaching the metallic stay of the support rail adjacent these pillars may help to transfer any force that is experienced by the support rail directly to the pillars.

A plastic cap 22 is provided to enclose the support rail 16. The plastic cap 22 can have a generally "L" or "J" shape in cross section that includes a first edge 70 engaging a first edge 72 of the elongated base 20 and a second edge 74 engaging a second edge 76 of the elongated base 20. Plastic cap 22 can be retained by elastically deforming around plastic projection 78 and edge 76. Edge 74 of plastic cap 22 can similarly be retained by an interference fit between edge 76 and a wall 80 defining trough 17. Alternatively, clips, or another fastening system may be used to secure the plastic cap to the support rail elongated base.

With reference to FIGS. 6 and 7, the metallic stay 40 can be integrally formed as a single piece component. The metallic stay 40 may be formed from any suitably sturdy metal, one example being die cast aluminum. While the metallic stay 40 is shown as a single piece component, it could also be formed from two or more component pieces that are brazed, welded or otherwise joined by independent fasteners.

In addition to cross bar mating wall 42 and roof engaging portion 44, stay 40 can include a buttress wall 52 extending angularly between cross bar mating wall and roof engaging portion 44, and juxtaposing the cross bar mating wall 42. Buttress wall 52 can include a generally corrugated surface of indents 90 and detents 92 to provide improved strength. Buttress wall 52 can also include a pair of passages 54 disposed in an opposed manner relative to passages 46 to allow fasteners 32 of varied length to be employed, wherein the penetration end of the fastener can access an interior cavity 84 (see FIGS. 4 and 5) of the support rail 16. Similarly, roof engaging portion 44 can include openings 86 providing access to nut 50 (see FIGS. 4 and 5) for roof attachment. Particularly, the internally threaded nut 50 or like fastening component may be fastened to the bolt 51 when the plastic cap 22 is removed and a tool inserted through access opening 86 to secure the support rails to the roof 12.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A roof rail for mounting to an associated vehicle, said rail comprising:

an elongated base comprised of plastic and at least two stay members comprised of metal, said stay members having a first surface oriented for mating with a roof of the vehicle and a second surface oriented for receiving a cross bar, said stay members being at least partially encapsulated by the plastic forming said elongated base, said first surface including at least two openings configured for receiving a fastener, said second surface including at least two passages configured for receiving a fastener, and an elongated cap element comprised of plastic, said cap element including a first edge engaging said base adjacent the first surface of each of said stay members and a second edge engaging said base adjacent the second surface of each of said stay members, and wherein said second surface is uncovered by said cap element.

2. The roof rail of claim 1 wherein said stay members are comprised of one of aluminum and aluminum alloy.

3. The roof rail of claim 1 wherein said elongated cap element forms an uninterrupted exterior surface of said roof rail.

4. The roof rail of claim 1 wherein the second surface of the stay members is at least substantially flush with an adjacent plastic region of said elongated base.

5. The roof rail of claim 4 wherein said second surface is at least substantially the same color as the adjacent plastic region of said elongated base.

6. The roof rail of claim 1 wherein said openings are defined by a projection.

7. The roof rail of claim 1 wherein said elongated base is received within a trough formed in a roof of the vehicle.

8. The roof rail of claim 1 wherein at least a majority of an exterior surface of the stay members is encapsulated by the plastic forming the elongated base.

9. The roof rail of claim 8 wherein a region of said second surface receiving said cross bar is unencapsulated.

10. The roof rail of claim 9, wherein said cross bar includes a stay engaging end having a perimeter and wherein said unencapsulated region of said second surface has a shape and dimension substantially the same as the perimeter of the stay engaging end of the cross bar.

11. The roof rail of claim 1 wherein said first surface and said second surface are approximately perpendicular.

12. The roof rail of claim 1 wherein said cap element is generally "L" or "J" shaped in cross-section.

13. A vehicle article carrier rail adapted for attachment to a roof of a vehicle, said rail comprising:

an elongated plastic base portion;

a metallic stay member encapsulated by said plastic base portion, said stay member including a roof engaging wall and a cross bar receiving wall, said cross bar receiving wall including top and bottom edges and first and second side edges, wherein the plastic encapsulating the stay member terminates adjacent at least three of the edges providing an unencapsulated stay member region; and a cover extending between the cross bar receiving wall and the roof engaging wall.

14. The article carrier rail of claim 13 wherein at least two removable bolts secure a cross-bar to the stay member.

15. The article carrier rail of claim 14 wherein said unencapsulated stay member region has a complimentary shape and dimension relative to a portion of the cross bar that engages said stay member.

16. The article carrier rail of claim 13 wherein the plastic encapsulating the stay member terminates adjacent each of the edges of the cross bar receiving wall.

17. The article carrier rail of claim 13 wherein said plastic encapsulating the stay member is flush relative to a surface of the cross bar receiving wall adjacent the three edges.

18. The article carrier rail of claim 13 wherein said roof engaging wall includes at least two bosses housing a nut having tool engaging surfaces.

* * * * *